United States Patent [19]

Schulze

[11] 4,253,358
[45] Mar. 3, 1981

[54] ELECTROHYDRAULIC FOLLOW-UP CONTROL APPARATUS

[75] Inventor: Eckehart Schulze, Weissach-Flacht, Fed. Rep. of Germany

[73] Assignee: Hartmann & Lämmle GmbH & Co., Rutesheim, Fed. Rep. of Germany

[21] Appl. No.: 55,308

[22] Filed: Jul. 6, 1979

[30] Foreign Application Priority Data

Jul. 7, 1978 [DE] Fed. Rep. of Germany ....... 2829911

[51] Int. Cl.³ .......................... B23B 5/46; F15B 21/02
[52] U.S. Cl. ......................................... 82/5; 82/24 R; 91/35
[58] Field of Search .................. 82/5, 24 R; 91/35

[56] References Cited

U.S. PATENT DOCUMENTS

| | | | |
|---|---|---|---|
| 3,677,115 | 7/1972 | Skrentner | 82/24 R |
| 3,726,184 | 4/1973 | Saito | 91/35 |
| 3,797,364 | 3/1974 | Schulze | 91/35 |
| 3,921,479 | 11/1975 | Katz | 91/35 |
| 3,993,565 | 11/1976 | Holthuis | 82/24 R |
| 4,036,086 | 7/1977 | Thumm et al. | 82/5 |

FOREIGN PATENT DOCUMENTS 292157 10/1953 Switzerland ................................... 82/5

Primary Examiner—Leonidas Vlachos
Attorney, Agent, or Firm—Michael J. Striker

[57] ABSTRACT

An electrohydraulic follow-up amplifier comprises a hydraulically operated prime mover constituted by a cylinder and a piston axially movable therein and fixedly connected to a connecting member. The arrangement includes further an electronically controlled motor, for instance a direct current servomotor driving for instance a nut meshing with the threaded spindle carrying a control member cooperating with valves for control flow of pressure fluid into and out from cylinder chambers to opposite sides of said piston of said prime mover. The spindle is connected to the connecting member over a coupling comprising a cylinder fixed to the connecting member and a piston fixed to the spindle. The piston of the coupling is movable between two abutments, one of which is adjustable by feeding pressure fluid into cylinder chambers to opposite sides of said piston of the coupling and flow of such pressure fluid is controlled by an additional valve which in turn in controlled from a cam disk which is turned in dependence on the movement of the connecting member.

16 Claims, 5 Drawing Figures

ELECTROHYDRAULIC FOLLOW-UP CONTROL APPARATUS

BACKGROUND OF THE INVENTION

The present invention relates to an electrohydraulic follow-up control apparatus with electrical drive means for a measuring spindle mounted turnably and axially movable in a housing which is connected with the piston in a working cylinder. The spindle, during the axial movement thereof, cooperates with valves in conduits for feeding, respectively discharging, pressure fluid into and from chambers located at opposite sides of the piston in the working cylinder. Such follow-up amplifiers are especially suitable for moving a slide in machine tools, especially when the same are constructed as disclosed in the U.S. Pat. No. 3,797,364 of the same inventor, the disclosure of which is hereby incorporated. The measuring spindle assumes the position of the slide, which is connected with the piston of the working cylinder, forming with the cylinder a hydraulic linear motor while cooperating with the valves to form with the latter a hydraulic-mechanical position regulating circuit. A direct current servomotor serves as the drive for the spindle, or else an electrical stepping motor may be used. In this way the speed, respectively, the travel information is rotary predetermined and transformed, via the pitch of the measuring spindle, into a linear movement of a given amplitude whereas the negative feedback control circuit (for instance the desired value guide via a servomotor with an incremental distance transducer system) has a range of adjustment of about 1 to 5000, the hydraulic control circuit has a range of adjustment of about 1 to one million. In machine tools it is often also required to position the tool very exactly, for instance with a tolerance of 0.001 mm and small speeds of movement, for instance 2 mm per minute, which presupposes that the spindle pitch of the measuring spindle is held very small, for instance 2 mm. Due to the necessary exact positioning and the limited range of adjustment it is possible to obtain maximum speeds of movement of about 10 meters per minute. Usually, the aforementioned electrical values are sufficient for the position- and speed regulating circuit for positioning of very exact drives.

SUMMARY OF THE INVENTION

In certain applications it is, however, necessary to operate with essentially higher speeds while obtaining the same exact positioning of the tool. It is therefore an object of the present invention to provide an electrohydraulically operated follow-up amplifier in which the speed regulating range is considerably increased by comparison to such amplifiers known in the art, while obtaining the same positioning exactness.

With these and other objects in veiw, which will become apparent as the description proceeds, the present invention relates to an electrohydraulic follow-up control apparatus for transmitting motion to a part of a machine tool or the like, which mainly comprises a connecting member adapted to be connected to the aforementioned part of the machine tool, fluid operated prime mover means comprising a cylinder element and a piston element axially movable in the cylinder element and dividing the latter into two chambers, one of said elements being connected to said connecting member for movement therewith, control means for feeding and discharging pressure fluid into and out from said chambers to move said piston element relative to said cylinder element, which the control means comprises a spindle component and a nut component cooperating therewith, drive means for rotating one of said components to thereby move the other component in axial direction and valve means actuated by the other component, coupling means between the other component and the connecting member for permitting limited relative movement of the other component and said one element and including a control member movable between two abutments in said connecting member, and means for moving said control member into engagement with a respective one of the abutments.

In this way the rigid connection between, for instance, the measuring spindle and the piston element of the prime mover means is interrupted and the speed of movement of the piston element is increased by the movement of the piston of the coupling means when the latter moves from one abutment to the other. Thus, it is possible to reach superimposed speeds of more than 60 meters per minute. Due to the abutment of the hydraulic position regulating circuit, exact end positions of the connecting member are obtained. The cylinder of the coupling means is rigidly connected, as is for instance the piston element of the prime mover with the connecting member, whereby a compact construction with small movable masses is obtained.

According to a further characteristic of the present invention at least one of the abutments is adjustable from the outside and the adjustment thereof may be carried out by a position motor (a step motor or a direct current motor with an incremental distance transducer system) so that the stroke of the piston of the coupling means is adjustable. The adjustable abutment preferably has an externally threaded portion screwed into the connecting member so that its adjustment may be carried out by turning the same about its axis. The necessary force is small so that only small electrical power is necessary.

Means may be provided on the measuring spindle cooperating with the housing of the coupling means preventing rotation of the measuring spindle while permitting axial movement of the latter. The piston of the coupling means may be arranged at the free end of the measuring spindle and be provided with a spoke projecting in axial direction from the piston and having a free end face adapted to engage a corresponding end face on the adjustable abutment.

The follow-up control apparatus according to the present invention may be advantageously used during cutting of a screw thread in a workpiece. In this case the piston element of the prime mover is connected with the holder of a thread cutting tool or chasing tool carrying out a component of movement in a direction normal to the axis of the workpiece.

The transverse movement of the screw thread cutting tool determining the pitch of the cut thread is mechanically obtained and transmitted to a slide, whereby the exactness of the pitch is obtained only in dependence on the number of revolutions of the workpiece. In prior art constructions the transverse speed of the tool is about 20 meters per minute and the use of an electrical regulating circuit for obtaining the desired pitch is not possible. If the thread has to be cut on a bolt without gradual change of the depth of the cut at opposite ends of the latter, the engaged screw cutting tool has to be moved very exactly and quickly out of the cut thread at the end of the thread cutting operation and the same is necessary for the radial advance of the cutting tool after the same has been moved back to the length of the cut thread whereby, during the renewed cutting, the tool has to be radially advanced for the new depth of the thread to be cut. In known screw cutting machines the whole slide with the drive via cams and mechanical linkage has to be moved and the masses to be moved are therefore very great, so that high mechanical stresses occur in the transmitting members. The speed of the transverse movement of the cutting tool can therefore not surpass a certain limit and considerable power is necessary for the drive.

By use of the follow-up amplifier accoding to the present invention it is possible to obtain essentially higher transverse speeds for the cutting tool, since the masses are held small and consist essentially only of the holder for the cutting tool, the cutting tool mounted thereon and the follow-up amplifier. The valve for control of the movement of the piston of the coupling means is operated by a cam disk which is driven over a transmission from the drive rotating the workpiece to be provided with the screw thread. The connection between the valve and the cylinder of the coupling means can be carried out via conduits of small cross section which do not produce any considerable mass loading during fast movements.

The tool holder, which is mounted on a slide movable in a direction normal to the axis of the workpiece and the piston element of the prime mover as well as the cylinder of the coupling means are connected to the tool holder, whereas the slide carrying the cylinder element of the prime mover is movable in direction parallel to the axis of the workpiece, by means of a cam disk which is rotated at the same number of revolutions per minute as the cam disk controlling the valve connected to the cutting means. Preferably, the two cam disks are constructed as a unit with two annular cam surfaces. In order to permit, with the arrangement of the present invention, the cutting of external as well as of internal screw threads, a reversing valve is provided between the valve controlling the coupling means and the latter.

The present invention may be used not only for cutting of screw threads but also for the breaking of chips in turning processes or for squeeze functions of any type. The follow-up amplifier according to the present invention is usable at all locations in which, besides high exactness at the usual moving speed, relatively large moving speeds are necessary which are outside the normal adjusting range.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
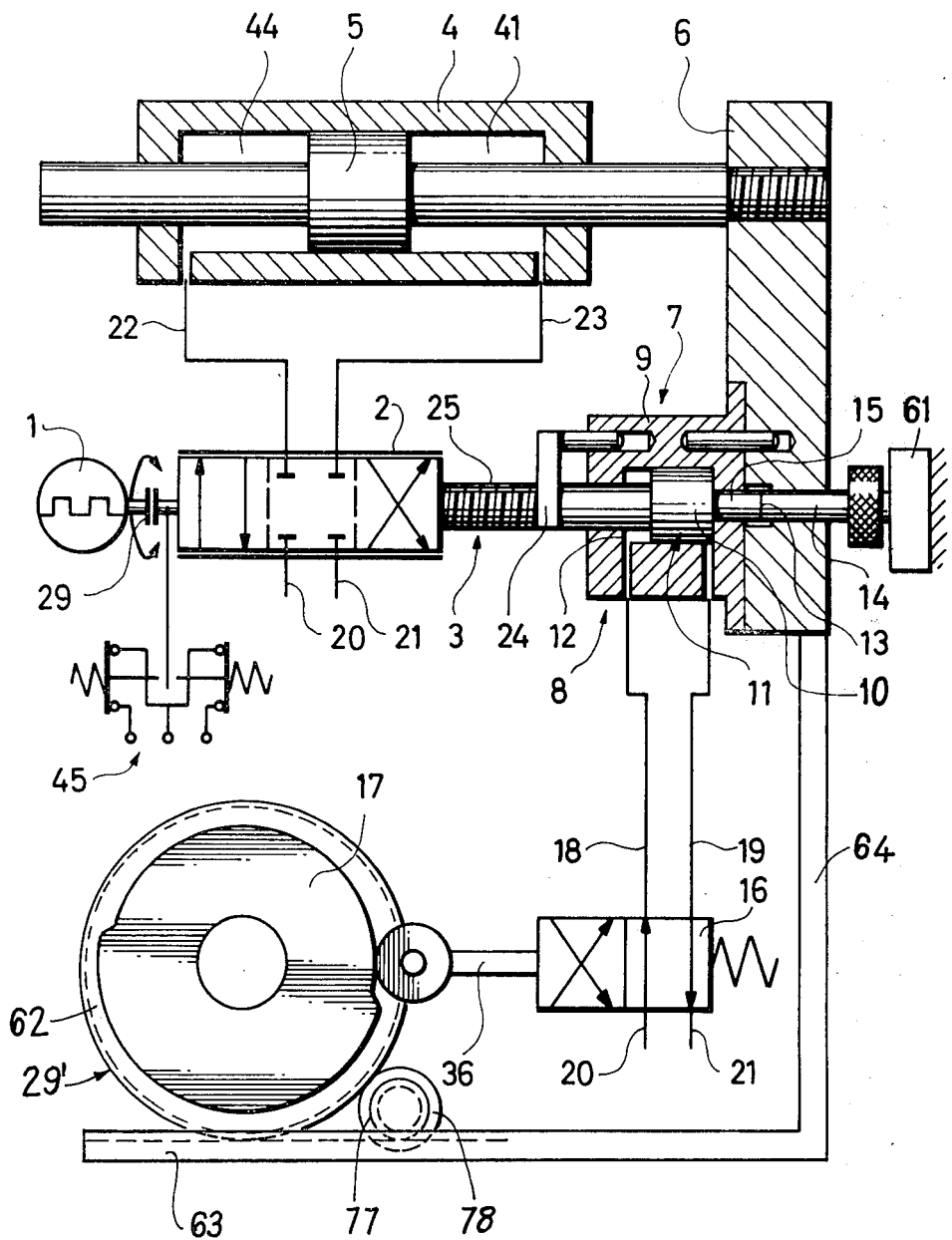
FIG. 1 is a schematic partly sectioned view of an electric hydraulic follow-up amplifier according to the present invention.

Referring now to the drawing and more specifically to FIG. 1, it will be seen that the electrohydraulic follow-up amplifier according to the present invention mainly comprises fluid operated prime mover means, including a cylinder 4 and a piston 5 axially movable within the cylinder 4 and dividing the latter into two chambers 41 and 44 at opposite sides of the piston 5. The arrangement further comprises control means for feeding and discharging pressure fluid into and out of the aforementioned chambers to move the piston relative to the cylinder, and the control means comprise electrical drive means 1, especially in the form of a direct current servomotor or an electrical step motor, a housing 2 in which a measuring spindle is axially movably mounted, a plurality of valves only schematically shown in FIG. 1 and to be described later on in further detail, and a mechanical feedback element by means of which the piston 5 and the measuring spindle 3 are connected to each other. The mechanical feedback element in the construction shown in FIG. 1 comprises a connecting member 6 adapted to be connected to a part of the machine tool and coupling means 7 between the connecting member 6 and the spindle 3. The coupling means 7 comprises a hydraulic element 8, the cylinder 9 of which is fixedly connected with the connecting member 6 and the piston 10 of which is fixedly connected to the end of the measuring spindle 3 and constitutes a moving element 11 for this measuring spindle. The piston 10 is hydraulically pressed against one of two abutments 12 and 13. In the arrangement shown in FIG. 1 the abutment 12 is formed by an end face or the bottom of the cylinder 9, whereas the abutment 13 is constituted by the end face of a threaded bolt 14 screwed into a correspondingly threaded bore formed in the connecting member 6 onto which the end face of a stud 15 projecting axially from the piston 10 may abut. The feeding of pressure fluid and discharge thereof from the cylinder line is controlled by a valve 16 which is actuated by a cam disk 17. The cam disk 17 is fixedly connected to a gear 62 coaxially therewith, which n eshes with the rack 63. The rack 63 and the gear 62 thus form the drive 29' for the cam disk 17. The rack 63 itself is rigidly connected by a member 64 with the connecting member 6, as schematically shown in FIG. 1.

Figure 4:
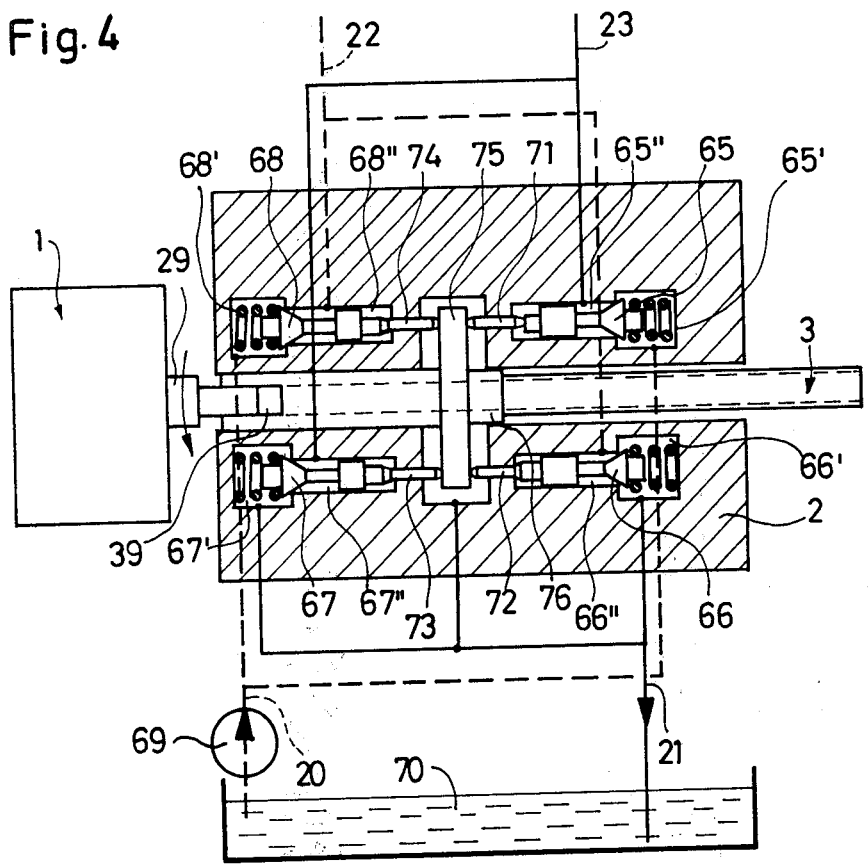
FIG. 4 is a cross section through the housing shown in FIG. 1 and illustrating the actual valve arrangement only schematically shown in FIG. 1.

Referring now to FIG. 4 in which the valve arrangement in the housing 2 only schematically illustrated in FIG. 1 is shown in detail, it will be seen that there are provided four valves 65-68 arranged parallel to the measuring spindle 3 and respectively pressed by springs against valve seats formed between outer valve chambers 65'-68' and inner valve chambers 65"-68". The outer valve chambers 65' and 68' of the valves 65 and 68 are connected by pressure conduits 20 to a pressure pump 69 which feeds pressure fluid, for instance oil, from a tank 70. The outer valve chambers 66' and 67' are connected by practically pressureless conduit 21 with the tank 70.

The inner valve chambers 65" and 67" are connected via the conduit 23 with the chamber 41 in the cylinder 4, whereas the inner valve chamber 65" and 68" are connected via the conduit 22 with the chamber 44 of the cylinder 4.

The valves 65–68 may be moved by actuating pins 71–74 by the control member 75 against the biasing springs to an open position. The control member 75 is fixedly connected to a nut 76 that is turnably mounted in a corresponding bore of the housing, which in turn is driven via a coupling 39 and gearing 29 connected to the drive motor 1. The nut 76 is turnable by the drive motor 1 and the coupling 39 is constructed so that the nut may within limits be axially movable for actuating the valves 65–68. The nut 76 threadingly engages the measuring spindle 3 and the latter is prevented from turning about its axis by a turn preventing element 24 fixed to the measuring spindle outside the housing for movement in axial direction therewith and engaging with a portion thereof in a corresponding hole of the coupling means 7 as shown in FIG. 1, to prevent rotation of the measuring spindle about its axis while permitting axial movement of the same within certain limits.

The above-described arragement will operate as follows

If the nut 76 is turned by the motor 1 while the measuring spindle 3 remains stationary, the nut 76 will be axially moved and therewith also the control member 75 fixedly connected thereto, for instance toward the left as viewed in FIG. 4. Thereby, the two valves 67 and 68 are opened. Via the conduit 20 pressure medium will then flow from the outer valve space 68', the inner valve space 68" and via the conduit 22 into the chamber 44 of the cylinder 4, and the piston 5 therein will thereby move toward the right, as viewed in FIG. 1. Simultaneously therewith the connecting member 6 and also the measuring spindle 3 connected thereto by the coupling means 7, are likewise moved toward the right. The measuring spindle 3 thereby takes along the nut 76 toward the right so that the control member 75 is likewise moved toward the right, whereby the valves 67 and 68 are closed again. During this procedure pressure medium may flow from the other chamber 41 via the conduit 23 and the inner valve chamber 67" to the outer valve chamber 67' and further via the conduit 21 to the tank 17. During this operation the valves 65 and 66 are closed. If, however, the nut 76 is turned in the opposite direction, then a corresponding operation will be carried out in the opposite direction via the valves 65 and 66.

The movement of the connecting member 6 may also be carried out independent of the drive 1 by the coupling means 7. If, for instance, the piston 10 of the coupling means 7 are moved toward the left, as viewed in FIG. 1, by feeding pressure fluid through the conduit 19 into the cylinder 9 of the coupling means 7, then the spindle 3 moves the nut 76 also toward the left, as viewed in FIG. 4 and the valves 67 and 68 are opened and the piston 5 is moved correspondingly as described above. In order to increase the speed at which the connecting member 6 is moved, it is also possible to superimpose the movements produced by the drive motor 1 and that of the piston 10 of the coupling means 7 in order to obtain especially high movements of the connecting member 6. The adjusting speed of the drive motor 1, which is for instance a step motor, is limited. If its frequency of excitation is very high then the step motor may fall out of step so as not to reach any longer the desired adjustment speed. A reliable electrical control with the desired exactness is only possible with a limited speed, whereas the hydraulic adjustment operated by the electrical control is technically controllable even at considerably higher speeds. The arrangement according to the present invention therefore permits one to obtain an essentially higher working speed with very high reproducible adjustment exactness. The connecting member may for instance be controlled over its whole adjustment stroke with the exactness of a few thousandths of a millimeter. In order to obtain an exact positioning of the connecting member 6 it is for instance possible to couple a multiple potentiometer 78 via a gear 77 with the rack 63 shown in FIG. 1, by mens of which the motor 1 may be controlled by an electronic control of normal known per se construction.

Figure 5:
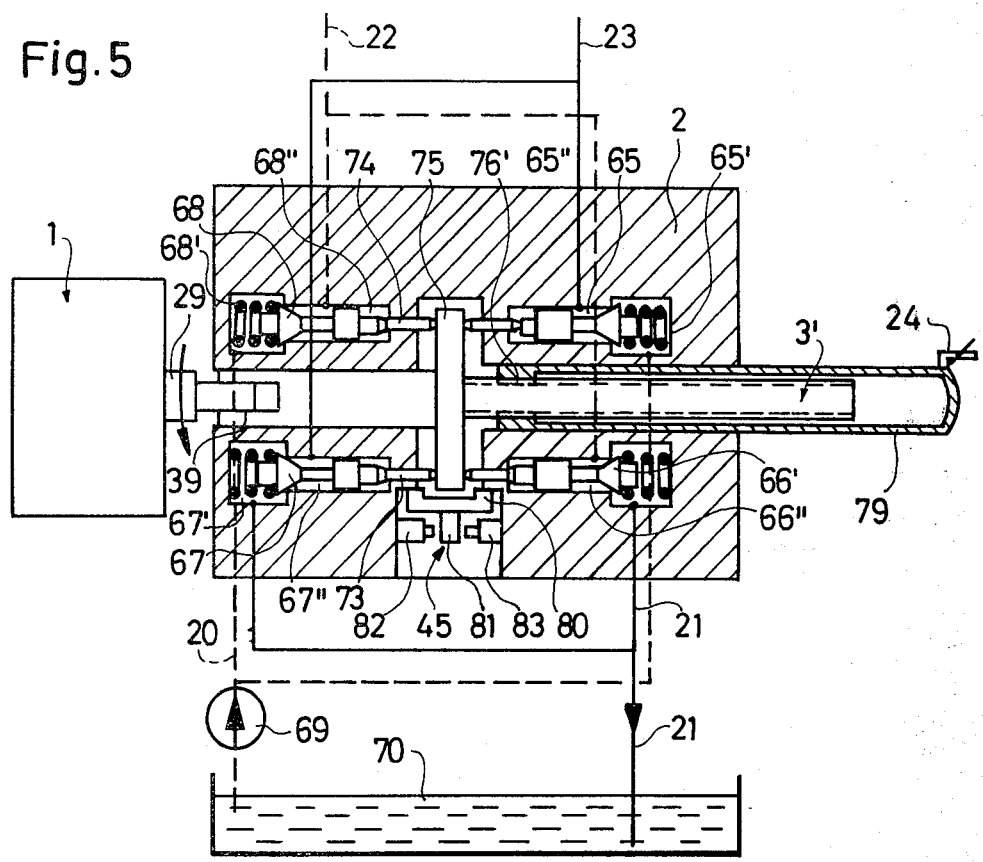
FIG. 5 is a cross section similar to FIG. 4 and showing a modified arrangement.

FIG. 5 shows a slightly modified arrangement which is similar to the arrangements shown in FIG. 4. However, in this arrangement the measuring spindle 3' is rotated via the gearing 29 and the coupling 39, whereas the nut 76' is connected by means of a connecting tube 79 is any convenient manner not shown in FIG. 5 with the piston 10 of the coupling means 7. The connecting tube 79 is also provided with an element 24, as described before in connection with FIG. 1, which prevents turning of the connecting tube 79 and the nut 76', fixed thereto about its axis while permitting axial movement of these elements within certain limits.

FIG. 5 further illustrates the overload protection 45 only schematically shown in FIG. 1. As shown in FIG. 1 the overload protection 45 comprises a member 80 extending parallel to the measuring spindle 3' and movable by the control member 75 in a direction parallel to this axis, whereby between the control member 75 and the inner faces of the member 80 extending parallel to the control member a certain clearance is provided. Projecting downwardly from the center of the member 80 is a pin 81 which, during movement of the member 80 by the control member 75, opens either the switch 82 or 83 to thereby interrupt the current supply to the drive motor 1.

Figure 2:
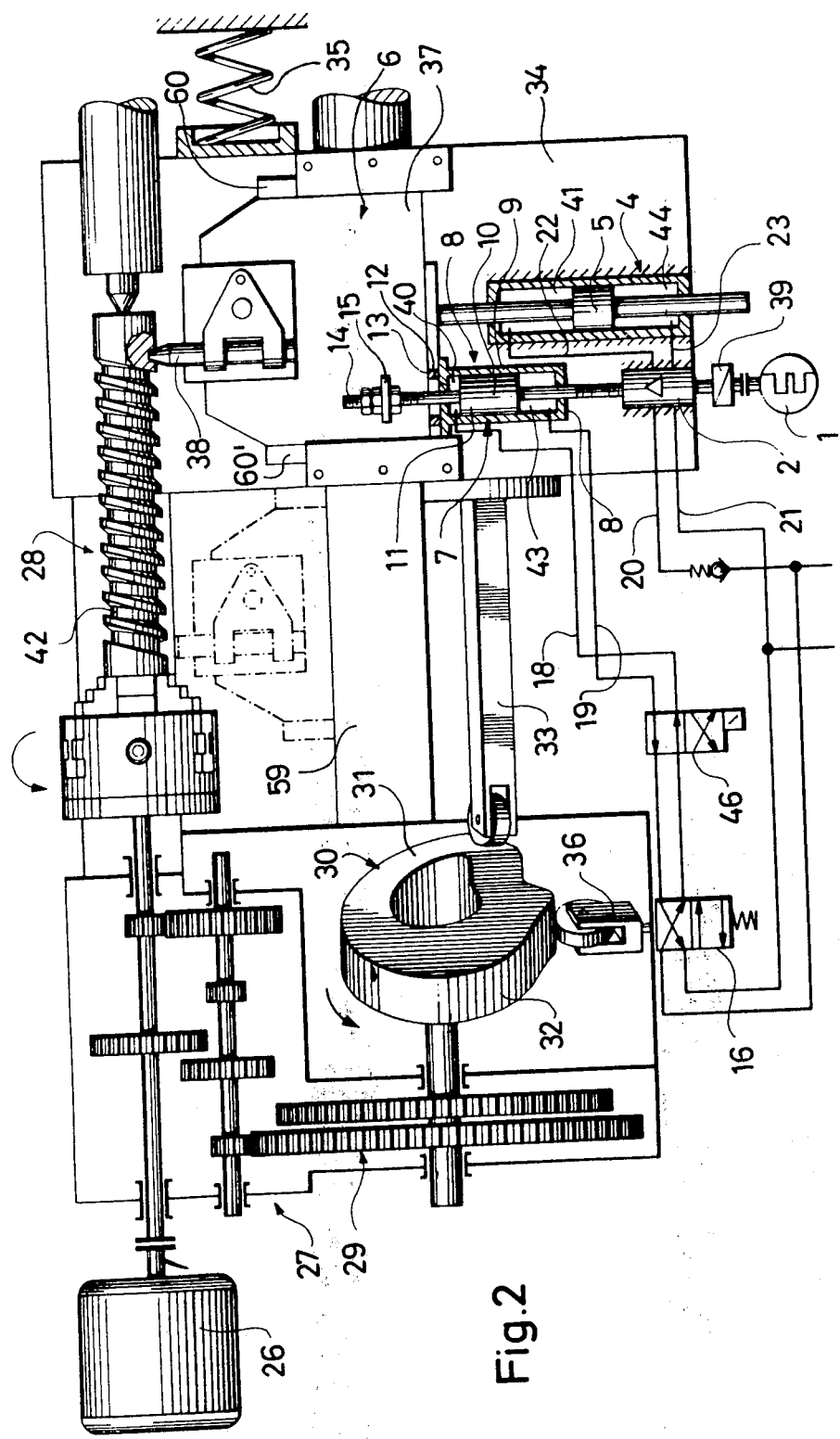
FIG. 2 is a schematic partly sectioned view of a screw cutting device with the follow-up amplifier according to the present invention.

FIG. 2 illustrates the use of the electrohydraulic follow-up amplifier in a screw cutting apparatus. An electromotor 26 drives via a gearing 27 the workpiece 28 which is to be provided with a screw thread 42. A further gearing 29 driven by the gearing 27 drives a cam disk 30 provided with the cam faces 21 and 32. The annular cam face 31 is provided on the right end face of the cam disk 30, as viewed in FIG. 2, whereas the cam face 32 is provided on the peripheral surface of the cam disk 30. A push rod 33 carrying at one end a roller in contact with the cam face 31 moves a slide 34 in a direction parallel to the axis of the workpiece 28 against the force of a return spring 35. The slide 34 is guided for movement parallel to the axis of the workpiece 28 on a member 59. A further push rod 36 engages with a roller mounted thereon the cam face 32 to thereby move the valve 16 during rotation of the cam 30 between the two positions thereof. The connecting member 6 shown in FIG. 1 is in this arrangement constructed as a tool holder 37 carrying a screw cutting tool 38 and the member 6 is guided by flanges 60 and 60' on opposite sides thereof in corresponding portions of the slide 34 for movement in direction normal to the axis of the workpiece 28. The piston 5 of the prime mover is fixedly connected by its piston rod to the connecting member 6 and so is the cylinder 9 of the coupling means 7. The cylinder 4 of the prime mover is fixedly connected to the slide 34 and so is the housing 2 of the control means schematically shown in FIG. 2.

In the position illustrated in FIG. 2 the push rod 36 has moved the valve 16 to the position shown so that pressure medium is fed from the pump 69 shown in FIG. 4 via the conduit 18 into the upper chamber 40 of the cylinder 9 to move the piston 10 and the measuring spindle in a direction in which the valves in the housing 2 connect the chamber 41 in the cylinder 4 via the conduit 22 with the pump 69. Thereby the tool holder 37 is moved downwardly, as viewed in FIG. 2, and the tool 38 carried thereon is moved at high speed out of the threads 32 in the workpiece 28. This movement will stop when the abutment 15 movable with the piston 10 engages the abutment 30. The cam faces 31 and 32 are constructed and correlated in their position relative to each other in such a manner that as soon as the cutting tool 38 is moved out of the threads 42, the cam face 31 will release the push rod 33 to move toward the left as shown in FIG. 2, so that the slide will be moved in this direction by the return spring 35. If the slide 34 and the tool holder member 37 together with the tool 38 are thus moved back to the starting position shown in dash-dotted lines in FIG. 2, cam disk 30 is turned through a corresponding angle so that the push rods 36 have reversed the position of the valve 16 and the chamber 43 of the cylinder 9 is filled with pressure fluid, whereby the valves in the housing 2 are controlled by the measuring spindle in such a manner that pressure fluid will flow in the chamber 44 of the working cylinder 4 so that the tool holder 37 with the threading tool 38 moves into the first thread. Thereby the new depth at which the threading tool 38 penetrates in the workpiece, is adjusted by the rotary drive provided by the motor 1. The cam face 31 then moves the push rod 33 within the slide 34 and the tool holder 37 and the threading tool mounted thereon, again towards the right, as viewed in FIG. 2, and the thread is thereby cut to the desired depth until the tool 38 is again moved out of the thread in the manner described.

In order to use the arrangement shown in FIG. 2 also for cutting an inner screw thread a reversing valve 46 is provided between the valve 16 and the cylinder 9 of the coupling means. Of course, if the arrangement should be used for cutting an inner screw thread the cutting tool 38 has to be turned through 90° from the position shown in FIG. 2 in order to extend into the interior of a hollow workpiece and the cutting tool 38 has to be provided with a correspondingly bent cutting edge while the workpiece has to be mounted in overhand position in the chuck shown at the left end of the workpiece in FIG. 2.

Figure 3:
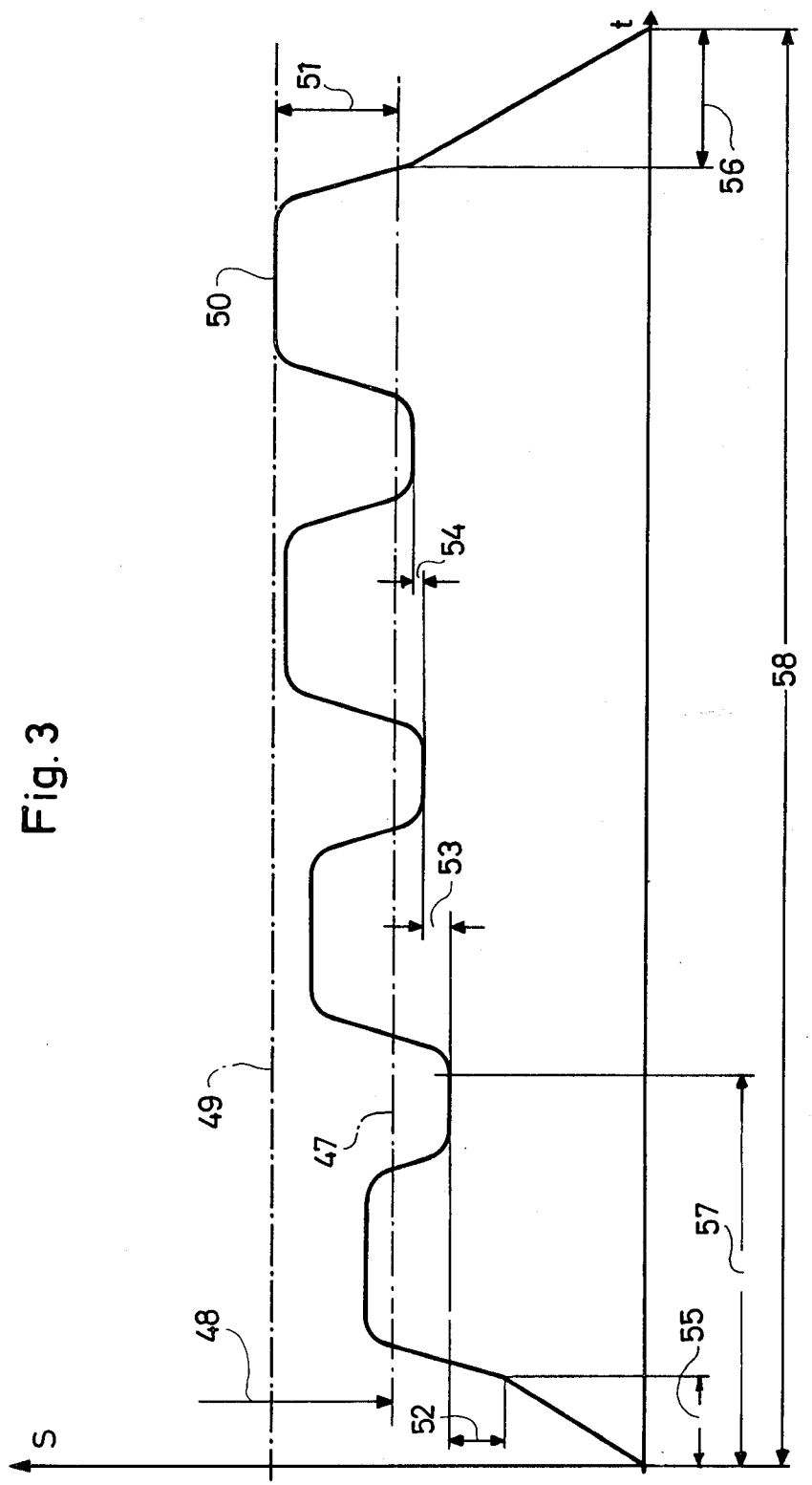
FIG. 3 is a displacement-time diagram for a screw cutting operation.

The displacement time diagram shown in FIG. 3 illustrates the operation during cutting of a thread in a workpiece. The displacement of the thread cutting tool 38 are entered on the ordinate s whereas the times for the successive operation steps are entered on the abscissa t. The dash-dotted line 47 indicates the outer diameter 48 of the workpiece 20 whereas the dash-dotted line 49 indicates the root 50 of the thread. The distance 51 between the lines 47 and 49 therefore corresponds to the depth of the screw thread. The further indicated distances 52, 53 and 54 in the direction of the ordinate indicate the adjustment of the threading tool during successive threading operations which are determined by the rotary drive 1. These distances decrease during successive operations. The time intervals 55 and 56 indicate the times of the quick return movements which at the beginning and the end of the thread cutting are determined by the rotary drive 1. The distance 57 in the direction of the abscissa t indicates the time necessary for one thread-cutting operation, and the total time 58 for completely finishing the cutting of the thread is also indicated in FIG. 3.

It will be understood that each of the elements described above, or two or more together, may also find a useful application in other types of electrohydraulic follow-up control apparatus differing from the types described above.

While the invention has been illustrated and described as embodied in an electrohydraulic follow-up control apparatus especially for use in a machine tool for cutting screw threads in a workpiece, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an electrohydraulic follow-up control apparatus for transmitting motion to part of a machine tool or the like, a combination comprising a connecting member adapted to be connected to the machine tool part; fluid operated prime mover means comprising a cylinder element and a piston element axially movable in the cylinder element and dividing the latter into two chambers, one of said elements being connected to said connecting member for movement therewith; control means for feeding and discharging pressure fluid into and out of said chambers to move said piston element relative to said cylinder element, said control means comprising a spindle movement and a nut component cooperating therewith, drive means for rotating one of said components to thereby move said one component in axial direction, and valve means actuated by said one component; coupling means between said other component and said connecting member for permitting limited relative movement of said other component and said one element, and including a control member movable between two abutments in said connecting member; and means for moving said control member into engagement with a respective one of said abutments.

2. A combination as defined in claim 1, wherein said piston element is connected to said connecting member.

3. A combination as defined in claim 1, wherein said drive means is connected to said spindle component.

4. A combination as defined in claim 1, wherein said coupling means comprise a cylinder and a piston axially movable in said cylinder and constituting said control member, and wherein said means for moving said control member comprise pressure fluid circuit means and additional valve means in said circuit means for respectively feeding and discharging pressure fluid into and out of said cylinder to opposite sides of said piston therein.

5. A combination as defined in claim 4, wherein said drive means is connected to said spindle component, and wherein said cylinder of said coupling means is fixedly connected to said connecting member and said piston of said coupling means is fixedly connected to said spindle.

6. A combination as defined in claim 1, wherein at least one of said abutments is adjustable in axial direction from the outside.

7. A combination as defined in claim 6, and further including an adjusting motor connected to said one abutment for adjusting the position of the latter.

8. A combination as defined in claim 6, wherein said one abutment comprises a threaded portion screwed into said connecting member so that the position of said one abutment may be adjusted by turning the same about an axis thereof.

9. A combination as defined in claim 5, wherein one of said abutments comprises a threaded portion screwed into said connecting member so that the position of said one abutment member may be adjusted by turning the same about an axis thereof, and wherein said piston of said coupling means is connected to one end of said spindle component and includes a stud projecting in axial direction from said piston and having a free end face adapted to engage a corresponding end face of said one abutment.

10. A combination as defined in claim 1, and further including a drive motor for rotating an elongated workpiece about its axis, guide means for guiding said connecting member movable in direction substantially normal to said axis, a tool holder fixed to said connecting member, and a threading tool in said tool holder.

11. A combination as defined in claim 10, wherein said coupling means comprise a cylinder and a piston axially movable in said cylinder and constituting said control member, and wherein said means for moving said control member comprise pressure fluid circuit means and additional valve means in said circuit means for respectively feeding it with charging pressure fluid into and out from said cylinder to opposite sides of said piston therein, and including cam means operatively connected to said additional valve means and transmission means between said cam means and said drive motor for rotating said workpiece.

12. A combination as defined in claim 11, wherein said piston element is connected to said connecting member, and including a slide mounting said connecting member and said tool holder mounted thereon movable in a direction normal to said axis of said workpiece, said cylinder of said coupling means being also connected to said connecting member for movement therewith, guide means for guiding said slide movable in a direction substantially parallel to said axis of the workpiece, additional cam means cooperating with said slide for moving the same in said direction, and transmission means between said drive motor and said additional cam means for rotating the same with the same number of revolutions per time unit as said first mentioned cam means.

13. A combination as defined in claim 12, wherein said first mentioned and said additional cam means are respectively constituted by two cam faces provided on a single cam member.

14. A combination as defined in claim 13, wherein one of said cam faces is constituted by a peripheral surface of said single cam member and the other by an annular end face thereof.

15. A combination as defined in claim 11, and further including a reversing valve in said pressure fluid circuit means downstream of said additional valve means.

16. A combination as defined in claim 1, wherein said coupling means comprise a cylinder and a piston axially movable in said cylinder and constituting said control member, and wherein said means for moving said control member comprise pressure fluid circuit means and additional valve means in said pressure fluid circuit means for respectively feeding and discharging pressure fluid into and out of said cylinder to opposite sides of said piston, said pressure fluid circuit means including pressure conduits respectively leading via said first mentioned valve means to said cylinder element of said prime mover and via said additional valve means to said cylinder of said coupling means and discharge conduits leading via said first mentioned valve means to said cylinder element of said prime mover and via said additional valve means to said cylinder of said coupling means, and a single pump for feeding pressure fluid into said pressure conduit, said discharge conduits communicating with a single tank.

* * * * *